(12) United States Patent
Smith et al.

(10) Patent No.: US 11,074,516 B2
(45) Date of Patent: Jul. 27, 2021

(54) LOAD BALANCING FOR DISTRIBUTED PROCESSING OF DETERMINISTICALLY ASSIGNED DATA USING STATISTICAL ANALYSIS OF BLOCK DATA

(71) Applicant: ORACLE INTERNATIONAL CORPORATION, Redwood City, CA (US)

(72) Inventors: Randall Smith, Palo Alto, CA (US); Suratna Budalakoti, Foster City, CA (US); Alan Wood, San Jose, CA (US)

(73) Assignee: ORACLE INTERNATIONAL CORPORATION, Redwood City, CA (US)

( * ) Notice: Subject to any disclaimer, the term of this patent is extended or adjusted under 35 U.S.C. 154(b) by 855 days.

(21) Appl. No.: 15/881,191

(22) Filed: Jan. 26, 2018

(65) Prior Publication Data
US 2019/0236474 A1 Aug. 1, 2019

(51) Int. Cl.
| | |
|---|---|
| *G06F 9/46* | (2006.01) |
| *G06N 7/00* | (2006.01) |
| *G06N 7/02* | (2006.01) |
| *G06F 16/22* | (2019.01) |
| *G06F 16/17* | (2019.01) |
| *G06F 9/50* | (2006.01) |

(52) U.S. Cl.
CPC ......... *G06N 7/005* (2013.01); *G06F 16/1724* (2019.01); *G06F 16/2272* (2019.01); *G06N 7/02* (2013.01); *G06F 9/5083* (2013.01)

(58) Field of Classification Search
CPC ...... G06N 7/005; G06N 7/02; G06F 16/1724; G06F 16/2272; G06F 9/5083
See application file for complete search history.

(56) References Cited

U.S. PATENT DOCUMENTS 8,510,538 B1 * 8/2013 Malewicz ................. G06F 9/54
712/225

* cited by examiner

*Primary Examiner* — Adam Lee
(74) *Attorney, Agent, or Firm* — Snell & Wilmer L.L.P.; Kent A. Lembke (57) ABSTRACT

Dynamic generation and implementation of assignment mappings of data items in large data files to distributed processors to achieve objectives such as reduced overall processing time like. Any appropriate key (e.g., character string) can be identified or obtained for each data item in a data file and the file can be segmented into sequential data blocks, where each data block includes a set of data items. The data items in each of a first plurality of the blocks (e.g., sampled block set) may be initially sorted into one of a plurality of key ranges of a search space (each corresponding to a different respective processor) and analyses conducted on the data items totals in each key range. The key range boundaries can be adjusted by accounting for uncertainty in the sample estimates to more evenly distribute data items from all blocks sent to each processor and thereby achieve the objective.

19 Claims, 8 Drawing Sheets

LOAD BALANCING FOR DISTRIBUTED PROCESSING OF DETERMINISTICALLY ASSIGNED DATA USING STATISTICAL ANALYSIS OF BLOCK DATA

BACKGROUND

1. Field of the Invention

The present invention generally relates to the field of parallel processing of large data sets and, more particularly, to the mapping and allocation of data items within the data sets to particular processors to achieve increased performance.

2. Relevant Background

Parallel computing is the simultaneous execution of the same task (split up and specially adapted) on multiple processors in order to obtain faster execution. Parallel computing is based on the fact that the process of solving a problem often can be divided into smaller tasks, which may be carried out simultaneously with some coordination. Parallel applications can include some segments of instructions that must be executed serially on each node using a single thread, and other segments of instructions that can be executed in parallel on each node using multiple threads. That is, each node utilizes a single processor while executing the serial code segments and spawns threads to other processors on that node while executing the parallel code segments.

In the case of a large set D of data items Di (e.g., terabytes (TBs), petabytes (PBs), etc.) and a large number of processors Pn (e.g., 10s to 1000s of processors), there is a problem of how to assign the data items Di to the collection of processors Pn for parallel processing, where each data item Di is typically processed by exactly one of the processors Pn. In many systems, assigning the data items Di to the collection of processors Pn includes running an "assignment plan" in a distinct phase before any processing starts. The assignment plan creates a map M that can map each data element Di to a particular processor Pn. Once the assignment plan phase completes and processing starts, the map M typically cannot be changed. The assignment plan generally tailors its plan as appropriate for each data set D. After processing, it is possible to know which processor Pn handled any particular data item Di by consulting the map M (e.g., known as "deterministically assigned" data processing) rather than having to individually poll each respective processor Pi (which is an expensive proposition). The purpose of the assignment plan is generally to achieve some performance goal, such as minimizing processing time.

MapReduce is a software framework for parallel data processing in a distributed computing environment and is commonly used for very large data sets (e.g., TBs to PBs) and large numbers of processors (e.g., 10s to 1000s). The "Map" procedure is usually a set of simple functions, such as scan and filter, performed by a set of processes or processors called "Mappers." Mappers operate on <key, value> pairs and send data to "Reducers" based on a defined mapping of the keys. The Reduce procedure is usually a set of more complex functions, such as sort and comparison, performed by a set of processes or processors called Reducers. Because the Reducers are more complex, they usually take a much longer time to process data then the Mappers. A MapReduce job finishes when all the Reducers are finished processing, and because the Reducers are performing the same operations on all the data, the amount of time required for each Reducer to finish is usually proportional to the amount of data it receives. Therefore, for MapReduce performance, it is important to equalize the load on each Reducer so that they finish at approximately the same time.

In any case, consider a large data file to be processed by a plurality of distributed or parallel processors. Each data item in the data file may have a key (e.g., numeric, alphanumeric, etc.) associated therewith that allows the data items to be sorted into order, or there may be a set of information associated with each data item that can be combined to create a key associated with each such data item. For instance, a person's last name from a database row concatenated with the row's file position would create an alphanumeric string (key) that can be used to sort each row into a unique sort position. During the assignment plan phase, one way to create the map M would be to divide the alphanumeric space into alphabetized ranges, with each range being sent to a particular processor. For example, records with keys starting with the characters A-C would go to processor 1, records with keys starting with the characters D-F to processor 2, and so on.

However, the resulting map is unlikely to produce an even load across processors because the data is unlikely to be spread evenly across the alphabet which thus unnecessarily lengthens the time to complete processing of all of the data items. While a perfect map could be created by aggregating all of the data items and then providing an equal amount of data to each processor, doing so would often take more time than the entire job with unevenly distributed data items.

SUMMARY

In view of at least the foregoing, the inventors have determined that analyzing certain statistical properties of a sample of segments or chunks of the data (e.g., file blocks, such as a particular quantity of consecutive lines from a database) can create a more accurate mapping of data items to distributed processors in a manner that reduces overall processing time and/or can achieve various other performance goals. For a particular data set or file, each individual data item can be associated with or otherwise individually identified by any appropriate key (e.g., character string or other identifier such as numeric, etc.) that allows for the tracking and sorting of the individual data item during the mapping and assignment process. For instance, any appropriate policy or method can be devised that allows each data item to have its own respective unique key. Furthermore, the file can be segmented into a plurality of contiguous or sequential data blocks, where each data block includes a set of data items.

A sort space can be initially segmented into key ranges, where each key range maps or corresponds to a different one of a plurality of processors. For instance, the data items in each of a first plurality of blocks (e.g., a sample drawn from all of the blocks of the data file, such as a random sampling) may be initially sorted into one of the key ranges based on their respective keys, and the first blocks may be ordered in the search space based on their respective position in the data file. In the event that the data items are not substantially evenly distributed among the plurality of key ranges (which typically results in the initial sorting because the data is unlikely to be spread evenly across the alphabet), the boundaries of the key ranges may be adjusted in various manners by accounting for the role of uncertainty in the sample estimates for purposes of seeking a more even distribution of data items being sent to each of the processors and thereby reducing total processing time of the data items.

Each block may generally include data items in most or all of the key ranges and thus contribute data items to most or all of the processors. For each processor, the total number of data items in its respective key range as contributed by the various first blocks may be summed, the mean number of data items per first block in that key range determined (by dividing the data item sum by the number of first blocks) to provide an estimate of the data items in each first block in the key range, and the standard deviation of the data items in each key range among the first blocks determined. Thereafter, the standard deviation of the data items in each key range among the first blocks may be manipulated along with the total number of first blocks to obtain an uncertainty in the mean number of data items per "second block" in the data file (the "standard error"). As used herein, the "second blocks" are those blocks in the data file having data items that will be sent to the distributed processors based on the assignment and mapping utilities disclosed herein. In one arrangement, the second blocks may be all or less than all of the blocks in the data file and include the first blocks. In other arrangements, the second blocks may represent less than all of the blocks in the data file and not include one or more of the first blocks. For instance, the second blocks may be at least partially non-overlapping with the first blocks (e.g., where the second blocks include at least one different block than the first blocks).

These values may then be used to adjust the key range boundaries to move closer to the objective (e.g., reduced overall processing time, completing processing according to some service level agreement processing time which may not necessarily be as fast as possible, etc.). As a simplistic example, assume the first key range included data items having keys whose first characters started with A-C and the second key range included data items having keys whose first characters started with D-F. After ascertaining the above-noted estimated totals and standard errors, it may be determined to adjust the range boundaries on the first key range to A-D and the range boundaries on the second key range to E-F. Moving a range boundary will of course increase the amount of data that will be mapped to one processor and decrease the amount going to another (e.g., by way of resorting at least some the data items in the first blocks into the key ranges after the boundary adjustment(s)). Accordingly, the mean number of data items per first block and the standard deviation of such data items per first block can be redetermined along with the standard errors for the key ranges of each processors. After each calculation of the above for each processor key range, a determination is made, based on the particular objective, as to whether to move the range boundaries or else set in place the assignment plan and map the data items in the key ranges to the respective processors.

When the objective is to reduce overall processing time (e.g., complete the job as quickly as possible), the range boundaries may be selected in a manner that substantially equalizes the probability that each processor will be the last to finish processing of the data items (e.g., from the second blocks) in its respective key range. For instance, the data item means per block and standard errors for each processor may be manipulated to obtain a probability of finishing last among all of the processors. When all processors are equally likely to finish last, they each have a probability of finishing last equal to 1/N, where N is the number of processors.

In one aspect, a method for use in managing loads among a plurality of parallel processors includes receiving, at a processor, a data file that includes a plurality of data items; determining a unique key for each data item of the plurality of data items; sampling a plurality of first blocks of the data items, where each first block includes a different subset of the plurality of data items; sorting the unique keys in each first block into one of a plurality of key ranges in a sort space, where each key range includes first and second boundaries (e.g., where the first and second boundaries represent respective lower and upper boundaries that define a range within which keys in the key range fall), and where each key range corresponds to a different respective one of the plurality of parallel processors; conducting, by the processor, an analysis on the unique keys in each key range to determine, for each key range, a probability of its corresponding parallel processor completing processing of all data items in the key range last among all of the plurality of parallel processors; adjusting one or more of the first and second boundaries of one or more of the key ranges based on the analysis such that the probabilities of the parallel processors approach equalization; and sending the data items in the data file associated with unique keys in each key range to the different respective ones of the parallel processors for processing after the adjusting based on a mapping that indicates which different respective one of the plurality of parallel processors is to process each of the plurality of data items.

In another aspect, a method of implementing an assignment plan to map each of a plurality of data items in a data file to one of a plurality of parallel processors includes sorting unique keys of data items in each of a plurality of first blocks of the data file into one of a plurality of key ranges in a sort space, where each key range corresponds to a different respective one of the plurality of parallel processors; determining, for each key range, a mean number of unique keys per first block in the key range; determining, for each key range, a standard deviation of the distribution of unique keys per first block in the key range; obtaining, for each different respective parallel processor, a measure of uncertainty in the mean number of unique keys per first block ("standard error") based on a) the standard deviation of the unique keys per first block in the corresponding key range and b) a total number of the plurality of first blocks; and generating, by the processor based on the a) mean number of unique keys per first block and b) the standard error for each different respective parallel processor, a mapping that indicates which different respective one of the plurality of parallel processors is to process each of the plurality of data items.

In a further aspect, a system for parallel processing of data items includes a plurality of interconnected processors for performing parallel processing of data items and a computing system interconnected to the plurality of interconnected processors. The computing system includes a processor and a memory interconnected to the processor and including a set of computer readable instructions that are executable by the processor to first sort unique keys of data items in each of a plurality of sampled blocks of a data file into one of a plurality of key ranges in a sort space, where each key range includes first and second boundaries, and where each key range corresponds to a different respective one of the plurality of interconnected processors; adjust, one or more times, one or more of the first and second boundaries of one or more of the key ranges; sort, after each adjustment, the unique keys of the data items in each of the plurality of sampled blocks of the data file into one of the plurality of key ranges in the sort space, wherein each adjustment is made such that a probability of each parallel processor completing processing of data items in its corresponding key range last among all of the parallel processors after the subsequent sort approaches equalization; and send the data items in the data file associated with unique keys in each key range to different respective ones of the parallel processors for processing after the one or more adjustments and sorts.

In addition to the exemplary aspects and embodiments described above, further aspects and embodiments will become apparent by reference to the drawings and by study of the following descriptions.

BRIEF DESCRIPTION OF THE DRAWINGS

FIG. 7 is a flow diagram of a method of generating and implementing an assignment mapping of data items in large data files to distributed processors to achieve objectives such as reduced overall processing time and the like.

DETAILED DESCRIPTION

The present disclosure is generally directed to various utilities (e.g., systems, methods, etc.) for use in dynamically generating and implementing assignment mappings of data items in large data files to distributed processors to achieve objectives such as reduced overall processing time and the like. Each data item in a data file can be associated with any appropriate key (e.g., numeric, alphanumeric, etc.) and the file can be segmented into sequential data blocks, where each data block includes a set of data items. The data items in each of a first plurality of the blocks (e.g., sampled block set) may be initially sorted into one of a plurality of key ranges of a search space (each corresponding to a different respective processor) and analyses conducted on the data items totals in each key range. The key range boundaries can be adjusted by accounting for uncertainty in the sample estimates to more evenly distribute data items from the blocks sent to each processor and thereby achieve the objective(s).

Figure 1:
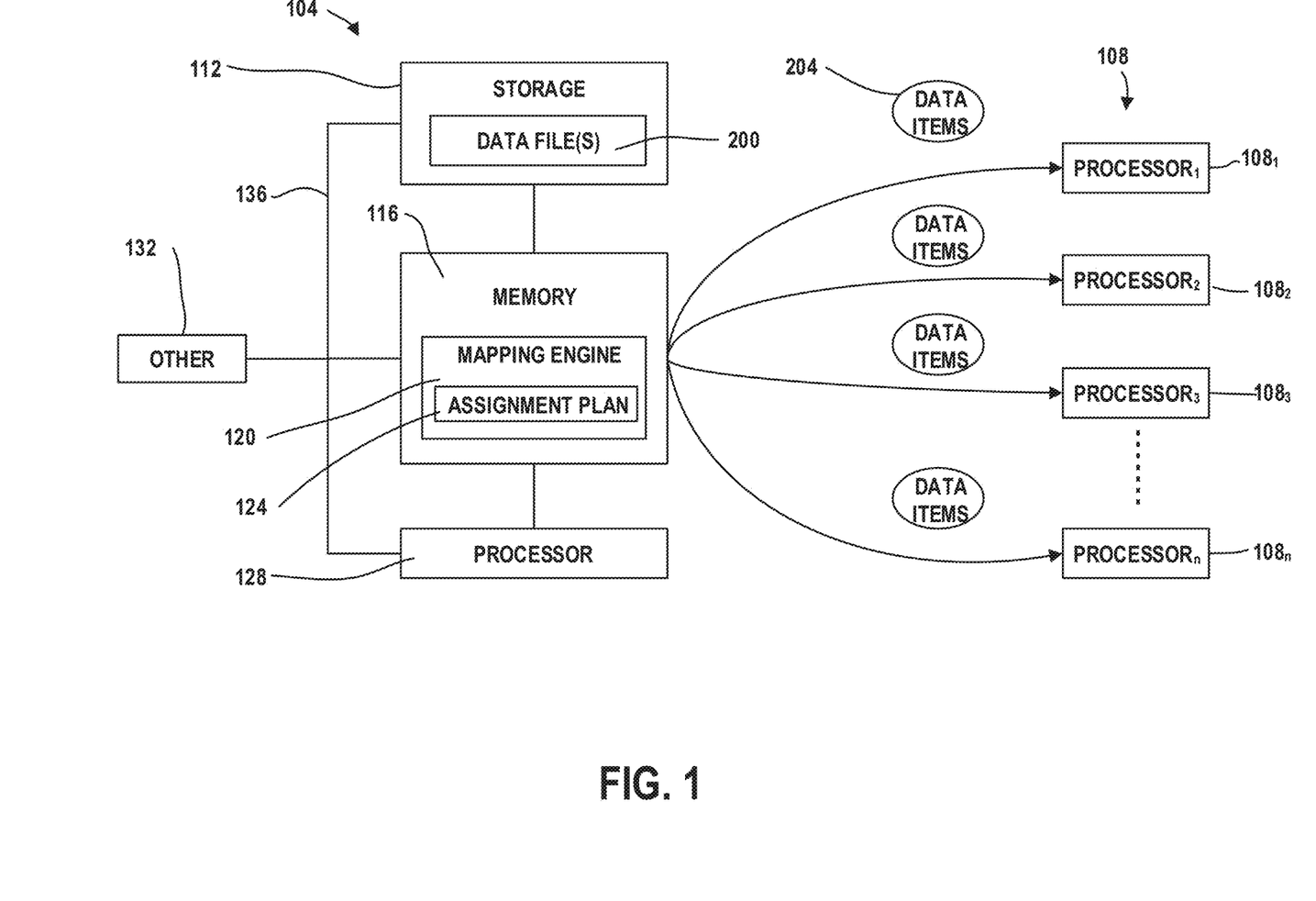
FIG. 1 is a block diagram of a computing device that performs parallel processing of a plurality of data items of a data file.

FIG. 1 is a block diagram of a system for performing parallel processing of a plurality of data items 204 of a data file 200. Broadly, the system may include any appropriate computing system 104 (e.g., server(s), collection of machines or processes, etc.) that is configured to receive and analyze the data file 200 and send the data item 204 thereof to a plurality of distributed processors 108 over one or more networks (e.g., local area network(s) (LANs), wide area network(s) (WAN(s)), Internet, etc.) for parallel processing of the data items 204. For instance, the various processors may perform parallel data processing in a distributed computing environment. The processors may have access to a shared memory to exchange information between processors in one arrangement or each may include its own private memory and exchange information by passing messages between the processors in another arrangement. In one embodiment, the processors 108 may be processing cores in a multi-core processor or may form part of a symmetric multiprocessor in which multiple processors share memory and connect via a bus.

As shown, the computing system 104 may include storage 112 (e.g., flash, other non-volatile memory device, etc.) on which the data file 200 may be stored, a memory 116 (e.g., one or more RAM or other volatile memory modules) including a mapping engine 120 (e.g. one or more sets of computer-readable instructions) for generating and implementing an assignment plan 124 to be used in sending the data items 204 to the various processors 108, a processor 128 (e.g., one or more central processing units (CPUs), processor cores, etc.) for executing the computer-readable instructions from the memory 116, and various components 132 (e.g., peripheral components, interfaces, etc.) that are not illustrated in the interest of clarity, all of which may be electrically interconnected by one or more busses 136, networks, and/or the like.

Figure 2:
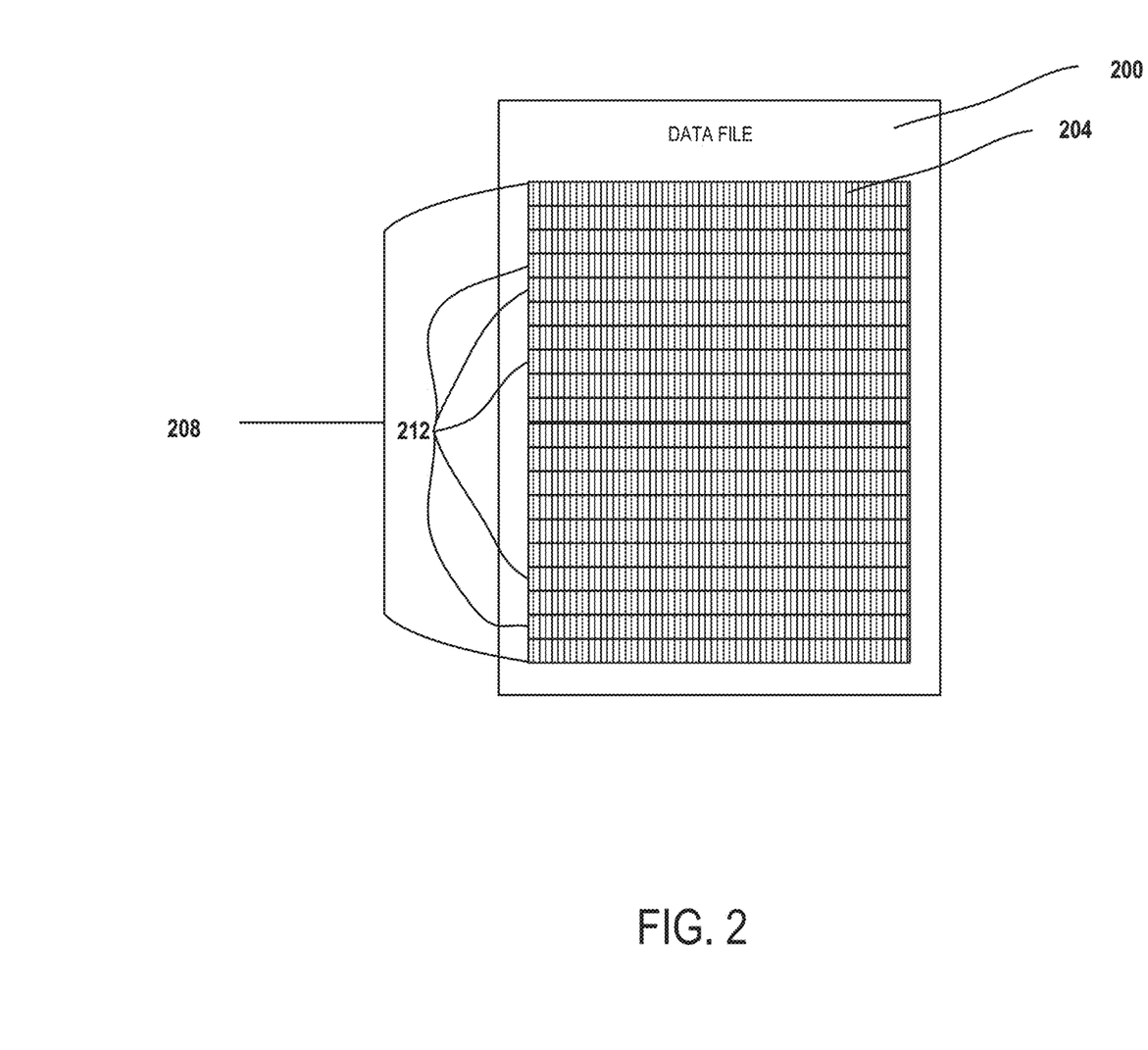
FIG. 2 is a schematic diagram of a data file made up of a plurality of sequential blocks of data items.

FIG. 2 presents a simplified schematic diagram of the data file 200 as including a plurality of data items or objects 204. For instance, the data items 204 may represent a plurality of sequential strings (e.g., numeric, alphanumeric) of data such as names, addresses, hashtags, and/or the like. As shown, the (e.g., entire) data file 200 may be segmented into a plurality of sequential blocks 208 (e.g., chunks), where each block 208 includes a different respective subset of the total plurality of data items 204 (e.g., but where each may include the same number of data items 204). As just one example, each block 208 could represent 1000 consecutive lines from a database. As discussed in more detail below, a plurality of sampled blocks 212 (a smaller number of blocks than the total number of blocks 208) may be analyzed for use in generating an assignment plan 124 (see FIG. 1) that distributes the data items 204 to the distributed processors 108 in a manner that achieves one or more objectives such as reduced overall processing time, compliance with one or more service level agreements, and/or the like. As used herein, a plurality of "first blocks" may be the sampled blocks 212 while a plurality of "second blocks" may be all of the blocks 208 of the data file 200 (e.g., including the sampled blocks 212). The sampled blocks 212 may be a random sampling of all of the blocks 208 (e.g., such that there is an unequal spacing of blocks 208 between the sampled blocks 212) so as to provide a statistically valid sample of all of the blocks 208. While the generated assignment plan 124 will be discussed in relation to all of the blocks 208, it is envisioned that the generated assignment plan 124 may be in relation to less than all of the blocks 208.

Figure 3:
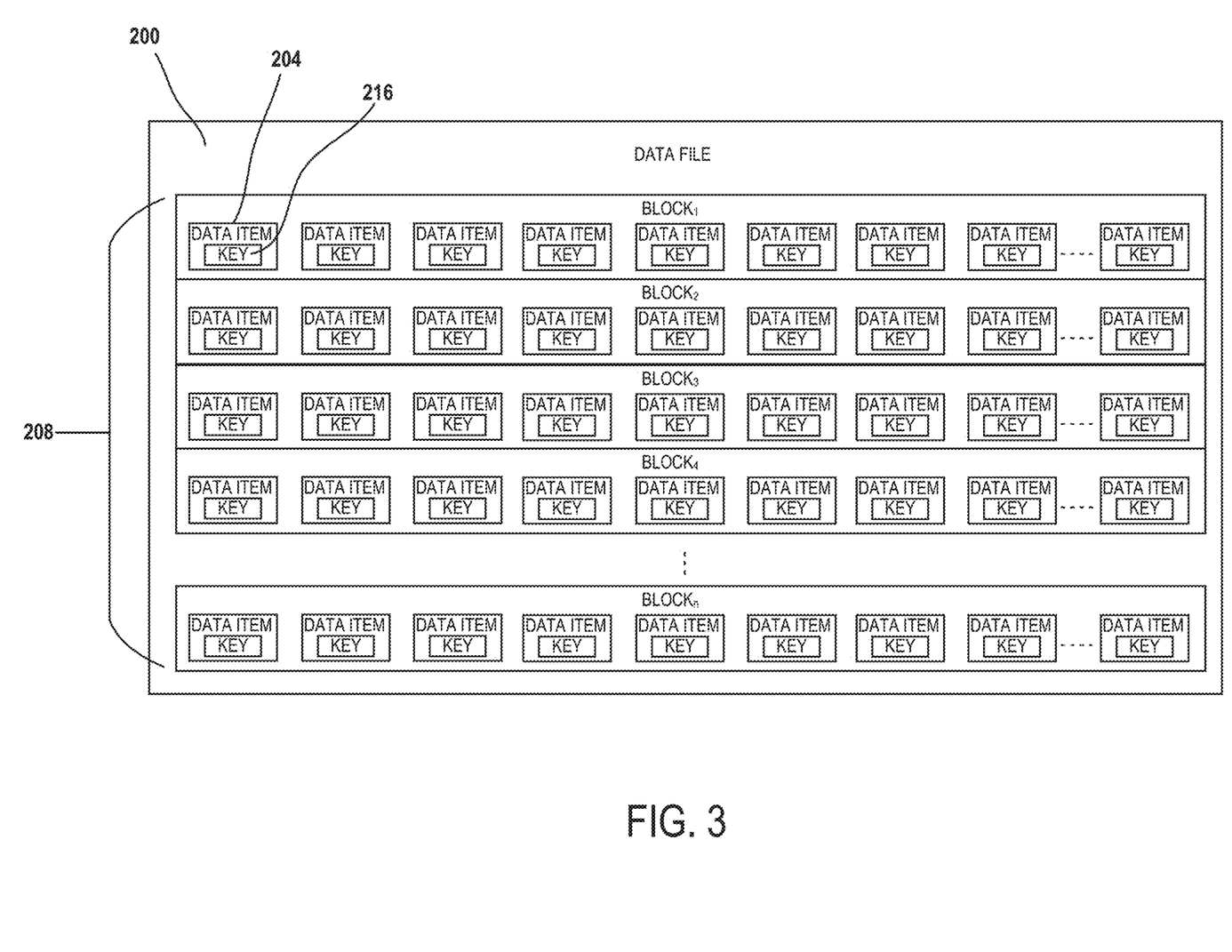
FIG. 3 presents a more detailed view of a plurality of blocks of the data file of FIG. 2.
Figure 4:
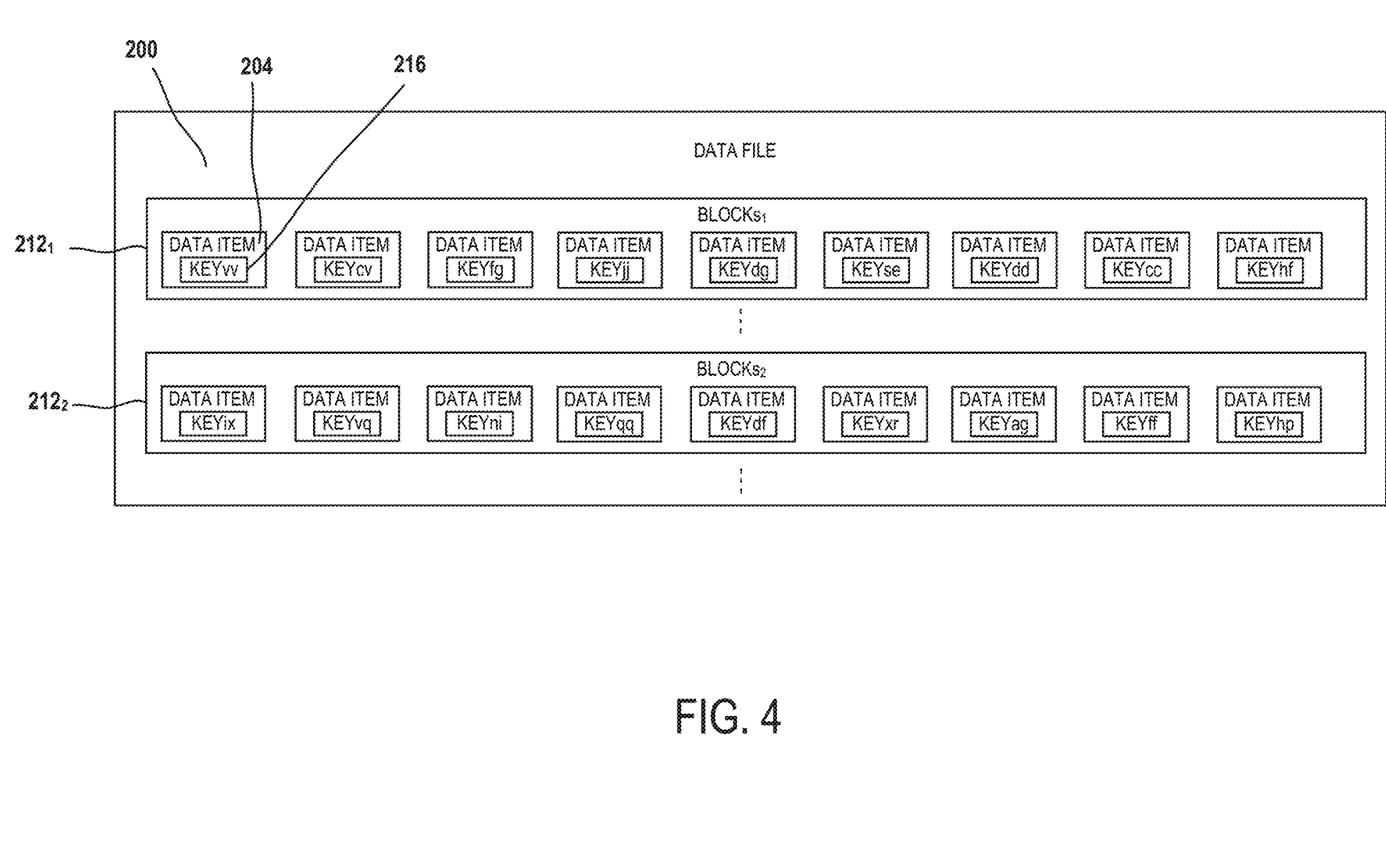
FIG. 4 is a schematic diagram of the first two block samples of the data file of FIG. 2.

FIG. 3 presents a more detailed view of the blocks 208 of the data file 200 and illustrates how each respective data item 204 may be identified by a unique key 216 (e.g., unique as to all of the other data items 204 in the data file 200) that may be used to sort the data items 204 as part of generating the assignment plan 124. In one arrangement, each key 216 may be in the nature of a numeric or an alphanumeric string associated with the respective data item 204 upon creation of the data file 200 before receipt at the computing system 104. In another arrangement, the computing system 104 (e.g., the mapping engine 120 or the like) may serve to generate a unique key 216 for each data item 204 by way of combining two or more attributes of the data item 204 (or according to any appropriate policy or the like). For instance, a person's last name from a database row concatenated with the row's file position could create the key 216 in the nature of an alphanumeric string. FIG. 4 presents a schematic view of first and second of the sampled blocks 212$_1$, 212$_2$ of the data file 200 and illustrates how each data item 204 includes a unique key 216 (e.g., "vv," "cv," "fg," etc.). To be clear, it is noted that the first and second sampled blocks 212$_1$, 212$_2$ are not necessarily (and typically are not) the first two blocks 208 of the entire data file.

Figure 6:
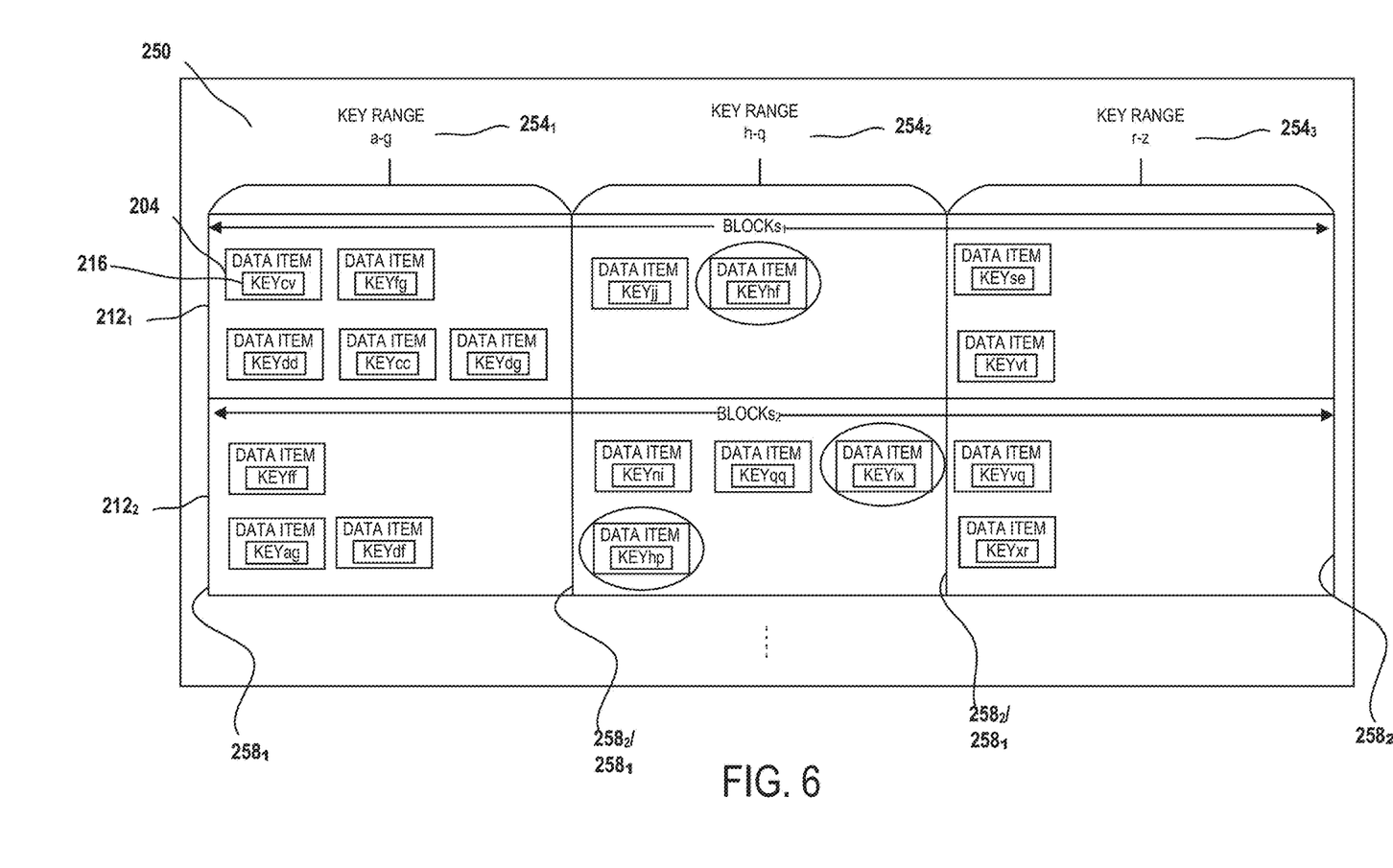
FIG. 6 is similar to FIG. 5 but illustrates the data items of the first two block samples being second sorted into the plurality of key ranges based on a second boundary of the key ranges.
Figure 7:
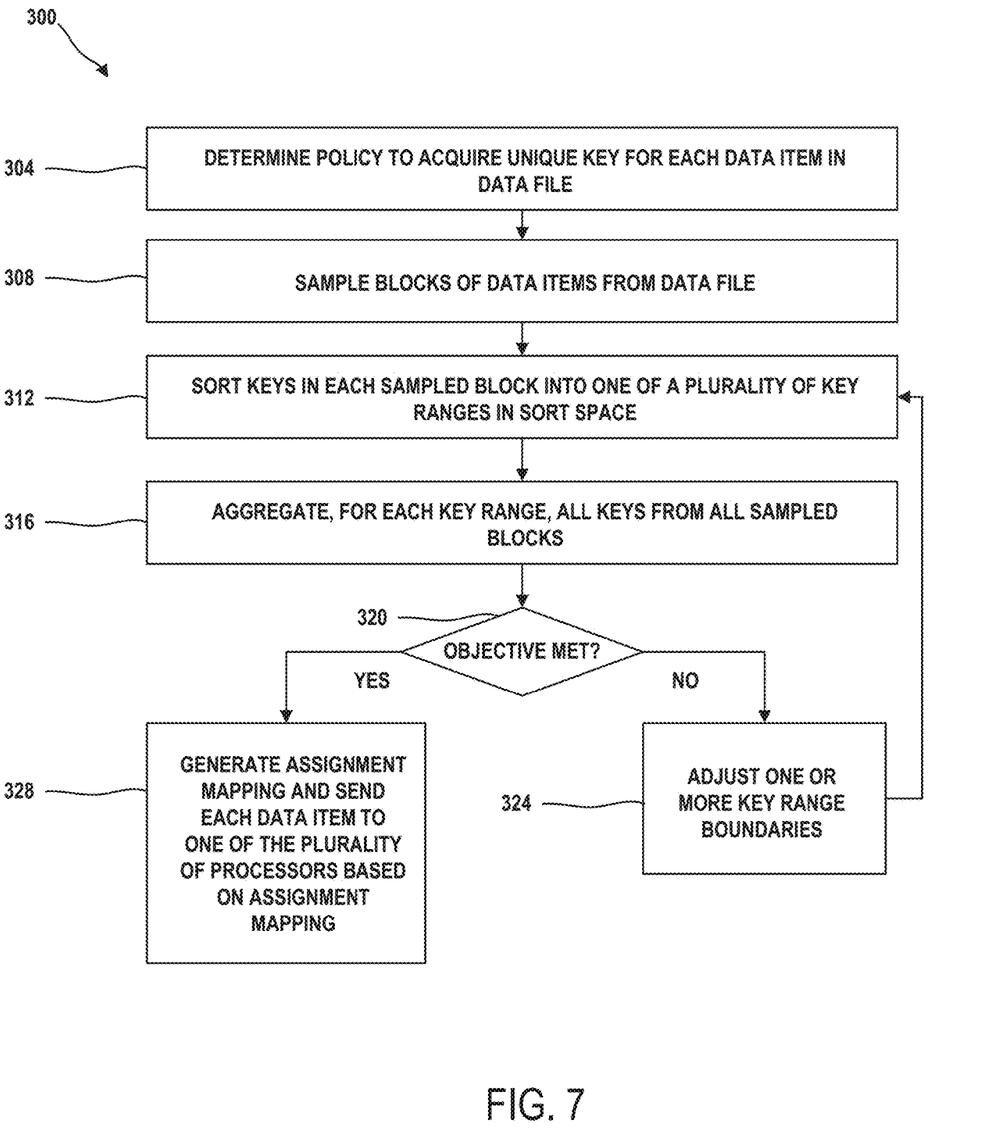

Reference is now made to FIG. 7 which is a flow diagram of a method 300 of generating and implementing an assignment mapping of data items in large data files to distributed processors to achieve objectives such as reduced overall processing time and the like. In conjunction with a discussion of the method 300 of FIG. 7, reference will also be made to FIGS. 4-6 to facilitate the reader's understanding of the disclosed utilities. While various steps of the method 300 are illustrated in a particular order, it is to be understood that various one of the steps may in some arrangements be performed in an order different than illustrated and that additional or fewer steps may be implemented.

At steps 304 and 308, the method 300 may include determining a policy to associate respective unique keys 216 with data items 204 in a data file 200 (e.g., according to a policy or the like) and sampling blocks of data items 204 from the data file 200. As discussed previously, for instance, an entirety or substantial entirety of the data items 204 in the data file 200 to be processed by the distributed processors 208 may be segmented into blocks 208 (a plurality of "second blocks"), where a subset of the total number of blocks 208 may be sampled to obtain a plurality of sampled blocks 212 (e.g., a plurality of "first blocks"), and where a total number of the first blocks is less than a total number of the second blocks. For instance, the second blocks may be at least partially non-overlapping with the first blocks. In one arrangement, the computing system 104 may maintain a separate representative file structure or database of the data items 204, unique keys 216, blocks 208, etc. (in the same position or sequence relative to each other as in the data file 200) such that the various utilities disclosed herein (e.g., in relation to sorting, adjusting, etc.) may operate primarily on such representative file structure or database rather than on the actual data file 200 itself.

Figure 5:
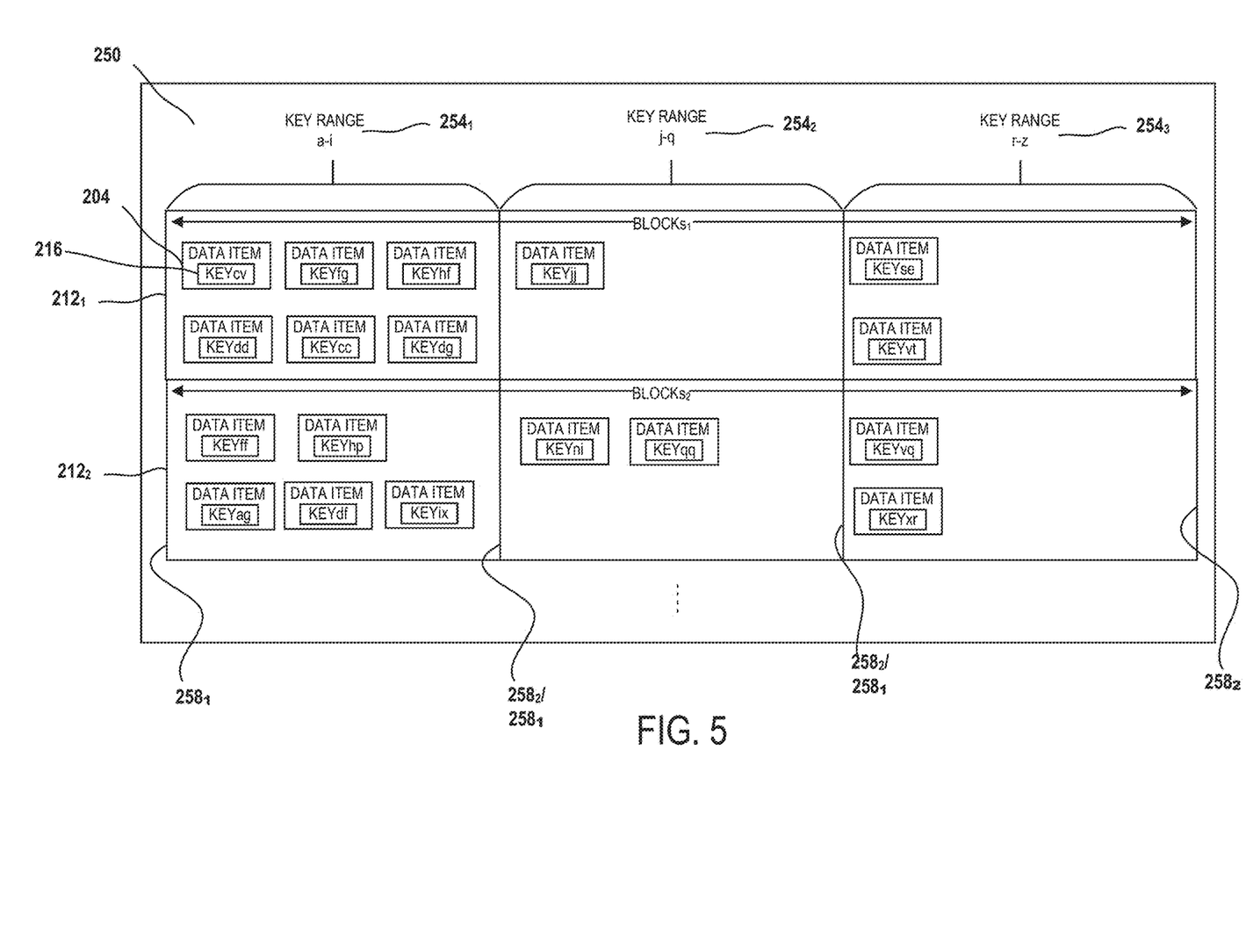
FIG. 5 illustrates the data items of the first two block samples of FIG. 4 being first sorted into a plurality of key ranges based on first boundaries of the key ranges.

Again with reference to FIG. 7, the method 300 may then include sorting 312 the keys 216 in each sampled block 212 into one of a plurality of key ranges in a sort space. For instance, FIG. 5 presents a simplified view of the first and second sampled blocks 212$_1$, 212$_2$ along with their data items 204 and respective keys 216 being disposed in a sort space 250. In one arrangement, the sort space may be a portion of the memory 116 into which the sampled blocks 212 and their respective data items 204 and keys 216 may be imported and manipulated (e.g., sorted, analyzed) as discussed herein. While the data items 204 are illustrated in the sort space 250 in FIGS. 5-6, the sort space 250 may in some embodiments actually only include the keys 216 and not the data items 204 themselves, it being understood that each key 216 could be mapped to its respective data item 204 in any appropriate manner throughout the assignment and mapping process.

In the example illustrated in FIG. 5, the sort space 250 may be divided into a plurality of key ranges 254 in any appropriate manner, where each respective key range 254 may be mapped to, linked with, or otherwise associated with a different respective one of the processors 108. Stated differently, all of the data items 204 in a respective key range after completion of the assignment utilities disclosed herein may be destined for and eventually sent to the respective one of the processors 108 with which the key range is associated. As a simplistic example, key range 254$_1$ may be associated with processor 108$_1$, key range 254$_2$ may be associated with processor 108$_2$, and key range 254$_3$ may be associated with processor 108$_3$. Each key range 254 may include first (e.g., lower) and second (e.g., upper) boundaries 258$_1$, 258$_2$ (e.g., numeric and/or alphanumeric characters) that define a different range into which the keys 216 may be sorted (e.g., where adjacent key ranges 254 may be non-overlapping).

Each of the first and second boundaries 258$_1$, 258$_2$ for each key range 254 may generally correspond in type to a portion of the type of keys 216 of the data items 204. As each key 216 is in the form of a two character alphanumeric string in the simplistic example illustrated in FIG. 5, each of the first and second boundaries 258$_1$, 258$_2$ may be in the form of one or more alphanumeric characters that represent, for instance, the first letter of a key 216. In one arrangement, adjacent key ranges 254 may share boundaries such that the second boundary 258$_2$ of a first key range (e.g., key range 254$_1$) is the same as (e.g., identical to) the first boundary 258$_1$ of an adjacent second key range (e.g., key range 254$_2$). In this regard, any appropriate "exclusive/inclusive" policy may be implemented that dictates into which key range 254 a data item is to be sorted when its respective key 216 falls on a common boundary 258. As an example when the common boundary 258$_2$/258$_1$ of the first and second key ranges 254$_1$, 254$_2$ in FIG. 5 was "j," the common boundary 258$_2$/258$_1$ may be "exclusive" for the first key range 254$_1$ and "inclusive" for the second key range 254$_2$ (e.g., meaning that any keys 216 starting with "j" would be sorted into the second key range 254$_2$). In one variation, each key range 254 may have its own unique first and second boundaries 258$_1$, 258$_2$. In one arrangement, the first character or so of the keys 216 of actual data items 204 may be selected as the various boundaries 258. In one embodiment, the various first and second boundaries 258$_1$, 258$_2$ may be selected to be of any desired level of granularity based on one or more characteristics of the keys 216 (e.g., type, detail, quantity, etc.).

In one arrangement, the first and second boundaries 258$_1$, 258$_2$ of the various key ranges 254 may be initially selected to such that the key ranges 254 are of a substantially equal size. In other words, the sort space 250 may be essentially divided into M equal parts (key ranges), where M corresponds to the number of distributed processors 108. The computing system 104 (e.g., the mapping engine 120) may then sort the keys 216 of the sampled blocks 212 into one of the key ranges 254 as illustrated in FIG. 5. In another arrangement, the first and second boundaries 258$_1$, 258$_2$ of the various key ranges 254 may be selected such that the key ranges 254 are not of a substantially equal size such as in the case where it is known beforehand that a large portion of the keys 216 begin with a particular letter of the alphabet or the like.

Turning again to FIG. 7, the method 300 may include aggregating 316 all of the keys 216 from all of the sampled blocks 212 in each respective key range 254 and querying 320 whether an objective has been met if the respective data items 204 corresponding to the keys 216 were to be sent to the respective processors 108 corresponding to the key ranges 254 within which the keys 216 are disposed. For instance, one objective may be to send an equal or substantially equal number of data items 204 to each processor 108 such that all processors 108 can complete processing of the respective data items 204 at the same or substantially the same time (e.g., assuming that each data items 204 takes the same amount of time to process as all of the other data items 204). In other words, the objective may be to complete processing of all of the data items 204 as quickly (or substantially as quickly) as possible. Another objective may be to complete processing according to some service level agreement or the like. Assuming the objective is met, the method 300 may then include generating 328 an assignment mapping or plan 124 and then sending the data items 204 from all blocks 208 to the various respective ones of the processors 108 based on the assignment plan.

As mentioned, the first and second boundaries $258_1$, $258_2$ of the key ranges 254 in FIG. 5 may be initially selected such that each key range 254 is of a substantially equal size or range. In the case where the keys 216 are alphanumeric characters that are not evenly spread across the alphabet, this arrangement can produce an uneven load across the processors 108 (as shown in FIG. 5) resulting in an increased length of time to complete the entire load of data items 204 of the data file 200 (or otherwise not meeting one or more objectives). As will now be discussed, various statistical properties of the keys 216 (or their respective data items 204) in each key range 254 from the sampled blocks 212 may be generated and analyzed (e.g., by the mapping engine 120) in one or more manners, one or more of the first and second boundaries $258_1$, $258_2$ of one or more of the key ranges 254 may be adjusted 324, and the keys 216 may again be sorted 312 and aggregated 316 which will result in different amounts of keys 216 being sorted into at least some of the key ranges 254 (e.g., more and fewer keys in respective adjacent key ranges 254). The one or more statistical properties can then be generated and analyzed to determine whether the one or more objectives (e.g., reduced processing time, meeting service level agreements, etc.) have been met.

In one embodiment, the value R(i, n, r) may represent the number of data items from a particular sampled block i that maps to processor n with particular dividing point quantities r (e.g., first and second boundaries $258_1$, $258_2$). With reference to the example in FIG. 5, for instance, R(i, n, r) for block $212_1$ in key range $254_1$ going to processor $108_1$ may be six. The mean number of data items $\mu_n$ per sampled block 212 for each processor n (i.e., for each key range 254) may then be determined The associated standard deviation $s_n$ of the distribution of data items $\mu_n$ per sampled block 212 may also be determined in any appropriate manner and used to calculate the standard error $\sigma_n$ in of the mean number of data items $\mu_n$ per block 208 for each processor n, where $\sigma_n$ may be represented as follows:

$$\sigma_n = \frac{s_n}{\sqrt{b}}$$

where "b" is the number of sampled blocks 212.

In the case where the total number of blocks 208 to be processed ("B") becomes increasingly small, the standard error $\sigma_n$ may be written as:

$$\sigma_n = \frac{s_n}{\sqrt{b}} \sqrt{\frac{1-\frac{b}{B}}{1-\frac{1}{B}}}$$

In one arrangement, it may be assumed that each data item is identical in processing demand, and requires one unit of time to process. Accordingly, a measure of data counts (e.g., $\mu$) may be freely substituted for time.

As discussed previously, one manner in which to complete processing of all data items as quickly (or as substantially as quickly) as possible is to identify a particular combination of first and second boundaries $258_1$, $258_2$ of the various key ranges 254 that equalizes the probability that each processor n will be the last to finish processing of its data items among all of the processors. When all processors n are equally likely to finish last, they each have a probability of finishing last equal to 1/N, where N is the number of processors.

To calculate the probability of finishing last, the following Gaussian probability distribution functions may be utilized:

$$P(\mu, \sigma, t) = \frac{1}{\sqrt{2\pi}\,\sigma} e^{-\frac{1(t-\mu)^2}{2\sigma^2}}$$

$$\Phi(\mu, \sigma, t) = \int_{-\infty}^{t} dt'\, P(\mu, \sigma, t')$$

The following numerical integration may be performed for each processor n to attain the probability of finishing last $L_n$ for the processor n:

$$L_n = \int_{-\infty}^{\infty} dt P(\mu_n, \sigma_n; t) \prod_{m=1}^{b} \Phi(\mu_m, \sigma_n; t)$$

Once the above quantities are known, the ranges or dividing point quantities r (e.g., first and second boundaries $258_1$, $258_2$) can be adjusted 324, the keys resorted 312 and re-aggregated 316, and then $L_n$ re-determined for each processor n, with an eventual goal of achieving equalization or substantial equalization of $L_n$ for all of the processors n. In one variation, the continuous product may be replaced in the integrand with the product that includes all processors, including the case m=n such that the resulting product is independent of n.

For instance, FIG. 6 illustrates the search space 250 after the common boundary $258_2'/258_1'$ of the key ranges $254_1$, $254_2$ has been adjusted (e.g., from "j" in FIG. 5 to "h" in FIG. 6, the key range $254_1$ being exclusive and the key range $254_2$ being inclusive). After such adjustment 324 and re-sorting 312, it can be seen how three of the data items 204 and/or their respective keys 216 (as indicated by the circles) are now in the key range $254_2$ rather than the key range $254_1$. While FIGS. 5-6 have been presented merely for purposes of illustration and to facilitate the reader's understanding of the invention, it can be appreciated how such adjustment 324 and re-sorting 312 may become increasingly complex with an increasing quantity of key ranges 254, sampled blocks 212, data items 204 and keys 216, and the like.

In the case where $L_n$ for a particular processor n is greater than a target value of 1/N (where N is the number of processors 108), the ranges or dividing point quantities r (e.g., first and second boundaries $258_1$, $258_2$) can be iteratively adjusted 324 such that the particular processor n receives fewer keys 216 (or fewer respective data items 204) upon a subsequent re-sorting 312. On the other hand, in the case where $L_n$ for a particular processor n is less than the target value of 1/N, the ranges or dividing point quantities r (e.g., first and second boundaries $258_1$, $258_2$) can be iteratively adjusted 324 such that the particular processor n receives more keys 216 (or more respective data items 204) upon a subsequent re-sorting 312. This approach to iteratively adjusting a vector of values $L_n$ may be similar to one or more "hill climbing" numerical analysis techniques.

One specific manner for obtaining equalization of $L_n$ for each of the processors n will now be discussed. Starting with the first processor n (e.g., processor $108_1$), its new upper bound (e.g., second boundary $258_2$) may be set according to the following:

$$r'_1 = \begin{cases} \alpha r_1; & L_1 > 1/N \\ (1+\alpha)r_1; & L_1 < 1/N \end{cases}$$

for some arbitrarily chosen $0<\alpha<1$ such as $\alpha=1/2$.

Once $r_1'$ is determined, the computing system 104 may move on to $$r'_2 = \begin{cases} r'_1 + \alpha(r_2 - r_1); & L_2 > 1/N \\ r'_1 + (1+\alpha)(r_2 - r_1); & L_2 < 1/N \end{cases}$$

The upper bound r value for processor n (the last key range 254) may be determined as follows:

$$r'_n = \begin{cases} r'_{n-1} + \alpha(r_n - r_{n-1}); & L_n > 1/N \\ r'_{n-1} + (1+\alpha)(r_n - r_{n-1}); & L_n < 1/N \end{cases}$$

Once all N−1 of the new range boundaries have been set, a new set of the $L_n$ may be determined. The process of adjusting the ranges may then be repeated as above after reducing the value of $\alpha$ according to $\alpha \leftarrow \alpha/2$. The process may terminate when all the $L_n$ values are sufficiently close to the target value of 1/N or, in another embodiment, when a time threshold has been reached or exceeded.

In one embodiment, $L_n$ may be substantially equalized for all of the processors n when $\mu_n$ and $\sigma_n$ for any key range satisfy the following:

$$\mu_n + \lambda(N)\sigma_n = c$$

Where $$\lambda(N) = \frac{\int_{-\infty}^{\infty} dz\, zP^2(z)F^{N-2}(z)}{\int_{-\infty}^{\infty} dz\, P^2(z)F^{N-2}(z)}$$

with $$P(z) = \frac{1}{\sqrt{2\pi}} e^{\frac{1}{2}z^2}$$

$$F(z) = \int_{-\infty}^{z} dz'\, P(z')$$

The above equations may hold assuming c is a constant value and assuming the various $\sigma_n$ are not too widely spread apart (e.g., such as when a ratio of a difference between any two standard deviations and the average of the standard deviations is much less than 1). Furthermore, $\lambda(N)$ winds up being a constant value that depends on the number of processors. Because evaluating the sum $\mu_n + \lambda(N)\sigma_n$ may not require performing a numerical integration (e.g., as does the computation of the probability of finishing last), balancing based only on the estimated total and standard error may be significantly faster. In one embodiment, c may be initially estimated with the average of the estimated totals ($\bar{\mu}$) and the average of the standard error ($\bar{\sigma}$) as follows:

$$c = \bar{\mu} + \lambda(N)\bar{\sigma}$$

Figure 8:
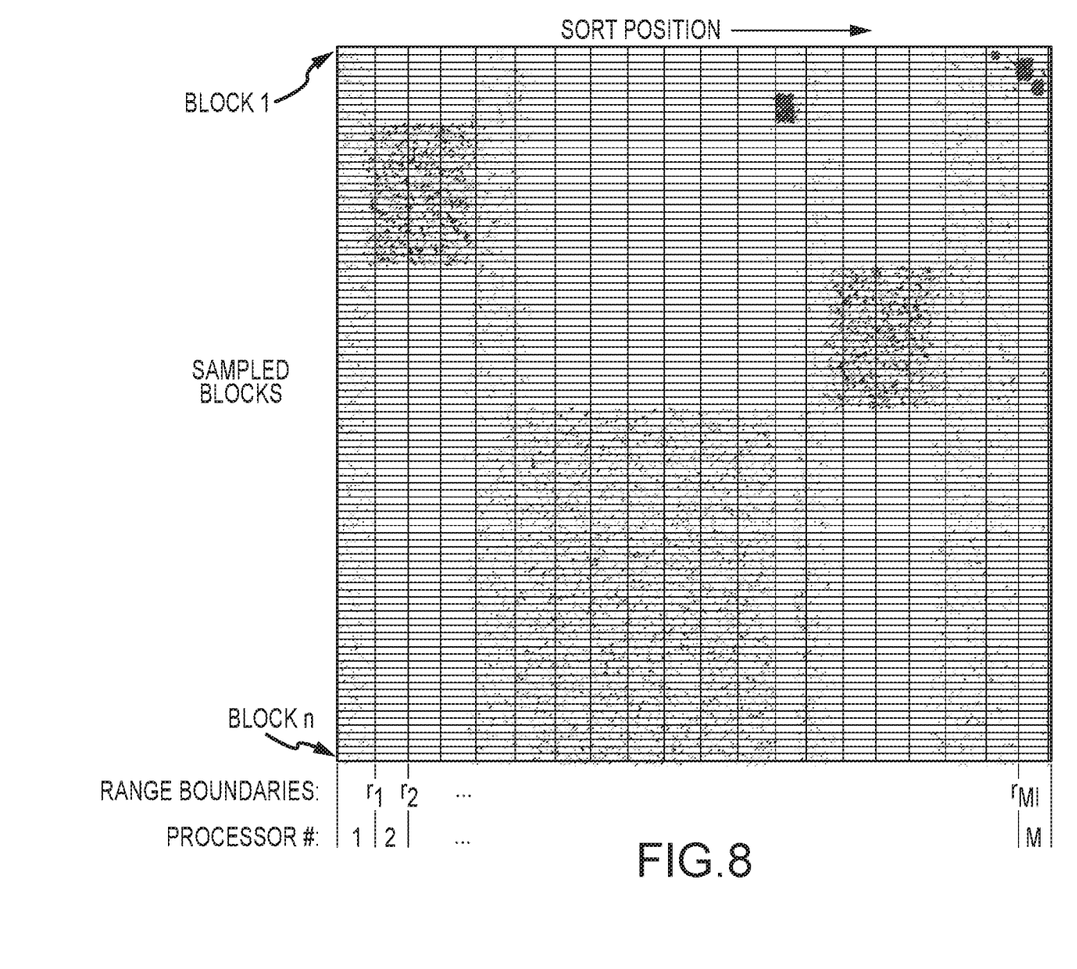
FIG. 8 is a plot of data items of a plurality of block samples of a data file being sorted into a plurality of key ranges.

FIG. 8 presents a plot of data items of a plurality of block samples of a data file being sorted into a plurality of key ranges. For instance, a large file (e.g., Gensort benchmark data) of N blocks is randomly sampled giving a set of n sampled blocks, and the resulting sample data are sorted. Each resulting data item is rendered as a point, with position in the file on the vertical axis, and sort position on the horizontal axis. Darker gray indicates that multiple display points overlap, with even darker gray indicating more than ten items overlap. Horizontal bands indicate blocks, with blocks further down the axis coming from later in the file. The vertical boundaries divide the data into sort ranges; each range will be assigned to one of M processors.

In some situations, multiple data items 204 can end up with the same sort priority which may be referred to as an occurrence of a "heavy hitter" (e.g., in the case where unique keys for data items 204 are not obtained). In FIG. 8, for instance, a "heavy hitter" may be presented in the nature of a long dark diagonal line (not shown) where those data points read in initially (at the top of the plot) may be sorted into the first positions at the left of the run and those getting read in later (lower down on the plot) may be towards the end of the run towards the right. In other words, there may be a progression from upper left to lower right.

In the event that a "heavy hitter" crosses over several key ranges 254, one solution is to assure that all items have a unique sort position by way of properly constructing the keys 216. For instance, the file position (e.g., the line number) of the key 216 may be appended at the end of the key 216. In another arrangement, the data items 204 may be sent to the heavy hitter processors 108 in round robin fashion to equalize the load among them. As the first and last processors 108 in the heavy hitter range may also be processing other data as well, their heavy hitter load can be diminished proportionately. To accomplish this, during the Assignment Plan phase, the sample data can be scanned for the processors in question to find the last sort value before the heavy hitter, and the first sort value after the heavy hitter. For example, if the entire data set consists of B blocks, and the sample consists of b blocks, and processor f is the first to handle a heavy hitter, the total amount of data it is expected to process is $(B/b)/(r_f - r_{f-1})$. If the first occurrence of the heavy hitter key is at sort position h, then the proportion of the time that processor f may be included in a round robin pass may be $(r_f - h)/(r_f - r_{f-1})$. A similar formula could be applied to the last processor f in the heavy hitter range.

It will be readily appreciated that many deviations may be made from the specific embodiments disclosed in the specification without departing from the spirit and scope of the invention. For instance, some arrangements envision that different data item types may require different amounts of processing time by the processors 108 and this may be taken account in the above discussion in any appropriate manner.

As mentioned, embodiments disclosed herein can be implemented as one or more computer program products, i.e., one or more modules of computer program instructions encoded on a computer-readable medium for execution by, or to control the operation of, data processing apparatus (processors, cores, etc.). The computer-readable medium can be a machine-readable storage device, a machine-readable storage substrate, a memory device, a composition of matter affecting a machine-readable propagated signal, or a combination of one or more of them. In addition to hardware, code that creates an execution environment for the computer program in question may be provided, e.g., code that constitutes processor firmware, a protocol stack, a database management system, an operating system, or a combination of one or more of them.

Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

We claim:

1. A method for use in managing loads among a plurality of parallel processors, including:
    receiving, at a processor executing code to provide a mapping engine, a data file that includes a plurality of data items, wherein the processor is communicatively linked via a communication network to the parallel processors;
    with the mapping engine, determining a unique key for each data item of the plurality of data items;
    with the mapping engine, sampling a plurality of first blocks of the data items, wherein each first block includes a different subset of the plurality of data items;
    with the mapping engine, sorting the unique keys in each first block into one of a plurality of key ranges in a sort space, wherein each key range includes first and second boundaries, and wherein each key range corresponds to a different respective one of the parallel processors;
    conducting, by the processor using the mapping engine, an analysis on the unique keys in each key range to determine, for each key range, a probability of its corresponding one of the parallel processors completing execution of all data items in the key range last among all of the parallel processors;
    with the mapping engine, adjusting one or more of the first and second boundaries of one or more of the key ranges such that the probabilities of the parallel processors approach equalization; and
    sending the data items in the data file associated with unique keys in each key range to the different respective ones of the parallel processors for execution after the adjusting based on a mapping generated by the mapping engine that indicates which different respective one of the parallel processors is to process each of the plurality of data items, wherein the parallel processors execute the respective data items in parallel.

2. The method of claim 1, wherein the conducting includes: summing, for each key range, the unique keys in the key range among all of the first blocks to obtain a sum of unique keys in each key range among all of the first blocks; and analyzing the sums.

3. The method of claim 2, further including: determining, for each key range, a mean number of unique keys per first block in the key range; determining, for each key range, a standard deviation of the unique keys per first block in the key range; and manipulating the mean and standard deviation for each key range, wherein the adjusting is based on the manipulating.

4. The method of claim 3, wherein the manipulating includes: obtaining, for each different respective parallel processor, a measure of uncertainty in the mean number of unique keys per first block ("standard error") in its corresponding key range based on a) the standard deviation of the unique keys per first block in the corresponding key range and b) a total number of the plurality of first blocks, wherein the probability for each parallel processor is based on a) the mean number of unique keys per first block in its corresponding key range and b) the "standard error" in its corresponding key range.

5. The method of claim 4, wherein the adjusting includes adjusting the one or more of the first and second boundaries of one or more of the key ranges such that for any of the key ranges, a sum of: a) the mean number of unique keys per first block for the key range, and b) a product of i) the standard error for the key range and ii) a constant, is equal to the same value.

6. The method of claim 1, wherein the adjusting includes adjusting the one or more of the first and second boundaries of the one or more of the key ranges so as to encompass fewer data items in the data file when the probability of the one or more parallel processors corresponding to the one or more of the key ranges is greater than the inverse of a total number of the parallel processors, and wherein the adjusting includes adjusting the one or more of the first and second boundaries of the one or more of the key ranges so as to encompass more data items in the data file when the probability of the one or more parallel processors corresponding to the one or more of the key ranges is less than the inverse of a total number of the parallel processors.

7. The method of claim 1, wherein the conducting includes determining that each key range has a different total number of unique keys compared to the other key ranges and wherein the adjusting includes adjusting the one or more of the first and second boundaries of the one or more of the key ranges such that that the total number of unique keys in each key ranges approaches equalization.

8. The method of claim 1, further including:
    receiving a request for the one of the plurality of parallel processors that processed a particular one of the plurality of data items identified by a particular unique key; and
    using the particular unique key as an index into the mapping to identify the particular parallel processor.

9. The method of claim 1, wherein each unique key is an alphanumeric string, and wherein each of the first and second boundaries of each of the key ranges is an alphanumeric string.

10. A method of implementing an assignment plan to map each of a plurality of data items in a data file to one of a plurality of parallel processors, comprising:
    with a mapping engine running on a computer system communicatively coupled to the parallel processors, sorting unique keys of data items in each of a plurality of first blocks of the data file into one of a plurality of key ranges in a sort space, wherein each key range corresponds to a different respective one of the parallel processors;
    with the mapping engine, determining, for each key range, a mean number of unique keys per first block in the key range;

with the mapping engine, determining, for each key range, a standard deviation of the unique keys per first block in the key range;

with the mapping engine, obtaining, for each different respective parallel processor, a measure of uncertainty in the mean number of unique keys per first block ("standard error") based on a) the standard deviation of the unique keys per first block in the corresponding key range and b) a total number of the plurality of first blocks;

generating, by the mapping engine based on the a) mean number of unique keys per first block and b) the standard error for each different respective parallel processor, a mapping that indicates which different respective one of the plurality of parallel processors is to process each of the plurality of data items; and sending the data items in the data file associated with unique keys in each key range to the different respective ones of the parallel processors for execution based on the generated mapping, wherein the parallel processors execute the respective data items in parallel.

11. The method of claim 10, further including:

using, for each different respective parallel processor, a) the mean number of unique keys per first block and b) the standard error for each different respective parallel processor, to determine a probability of the parallel processor completing execution of the data items in its respective key range last among all of the parallel processors;

adjusting one or more of the first and second boundaries of one or more of the key ranges such that the probabilities of the parallel processors approach equalization upon:

re-sorting the unique keys of data items in each of the plurality of first blocks of the data file into one of a plurality of key ranges the sort space after the adjusting;

re-determining, for each key range, the mean number of unique keys per first block in the key range; and re-determining, for each key range, the standard deviation of the unique keys per first block in the key range.

12. The method of claim 11, wherein the adjusting includes adjusting the one or more of the first and second boundaries of one or more of the key ranges such that for any of the key ranges, a sum of: a) the mean number of unique keys per first block for the key range, and b) a product of i) the standard error for the key range and ii) a constant, is equal to the same value.

13. A system for parallel execution of data items, comprising:

a plurality of interconnected processors performing parallel execution of data items; and a computing system interconnected to the plurality of interconnected processors via a communication network, the computing system including:

a processor; and a memory interconnected to the processor and including a set of computer readable instructions that are executable by the processor to provide functions of a mapping engine including to:

first sort unique keys of data items in each of a plurality of sampled blocks of a data file into one of a plurality of key ranges in a sort space, wherein each key range includes first and second boundaries, and wherein each key range corresponds to a different respective one of the plurality of interconnected processors;

adjust, one or more times, one or more of the first and second boundaries of one or more of the key ranges;

sort, after each adjustment, the unique keys of the data items in each of the plurality of sampled blocks of the data file into one of the plurality of key ranges in the sort space, wherein each adjustment is made such that a probability of each of the plurality of interconnected processors completing execution of data items in its corresponding key range last among all of the plurality of interconnected processors after the subsequent sort approaches equalization; and send the data items in the data file associated with unique keys in each key range to different respective ones of the plurality of interconnected processors for execution after the one or more adjustments and sorts, wherein the plurality of interconnected processors execute the respective data items in parallel.

14. The system of claim 13, wherein the set of computer readable instructions are executable by the processor to, after each adjustment and sort pair:

determine, for each key range, a mean number of unique keys per first block in the key range;

determine, for each key range, a standard deviation of the unique keys per first block in the key range; and manipulate the mean and standard deviation for each key range to determine the probability of the corresponding one of the plurality of interconnected processors.

15. The system of claim 14, wherein the set of computer readable instructions are executable by the processor to:

obtain, for each different respective one of the plurality of interconnected processors, a measure of uncertainty in the mean number of unique keys per first block ("standard error") based on a) the standard deviation of the unique keys per first block in the corresponding key range and b) a total number of the plurality of first blocks; and manipulate the standard error for of the mean number of keys per first block in each key range to determine the probability of the corresponding one of the plurality of interconnected processors.

16. The system of claim 15, wherein the set of computer readable instructions are executable by the processor to:

use, for each different respective one of the plurality of interconnected processors, a) the mean number of unique keys per first block and b) the standard error for each different respective one of the plurality of interconnected processors, to determine a probability of the one of the plurality of interconnected processors completing execution of the data items in its respective key range last among all of the plurality of interconnected processors.

17. The system of claim 13, wherein the one or more adjustments are made such that after the sort of a final one of the one or more adjustments, a sum of:

a) the mean number of unique keys per first block for each key range, and b) a product of i) the standard error for the key range and ii) a constant, is equal to the same value for each of the key ranges.

18. The system of claim 13, wherein each unique key is a numeric or an alphanumeric string, and wherein each of the first and second boundaries of each of the key ranges is a numeric or an alphanumeric string.

19. The system of claim 13, wherein the first and second boundaries of adjacent ones of the key ranges are identical.

* * * * *

UNITED STATES PATENT AND TRADEMARK OFFICE
CERTIFICATE OF CORRECTION

PATENT NO. : 11,074,516 B2  
APPLICATION NO. : 15/881191  
DATED : July 27, 2021  
INVENTOR(S) : Smith et al.

It is certified that error appears in the above-identified patent and that said Letters Patent is hereby corrected as shown below:

In the Specification

In Column 7, Line 6, delete "2121, 2122" and insert -- $212_1$, $212_2$ --, therefor.

In Column 7, Line 9, delete "2121, 2122" and insert -- $212_1$, $212_2$ --, therefor.

In Column 9, Line 44, after "determined" insert -- . --.

In Column 11, Line 10, after "bound" insert -- $r_1'$ --.

In Column 11, Line 20, after "on to" insert -- $r_2'$: --.

In Column 11, Line 37, delete "a" and insert -- $\alpha$ --, therefor.

In Column 12, Line 52, delete "$(B/b)/(r_j-r_{j-1})$." and insert -- $(B/b)/(r_f-r_{f-1})$. --, therefor.

In the Claims

In Column 14, Line 39, in Claim 7, after "ranges" insert -- , --.

In Column 14, Line 42, in Claim 7, delete "that that" and insert -- that --, therefor.

In Column 16, Line 37, in Claim 15, delete "for of" and insert -- for --, therefor.

Signed and Sealed this  
Eleventh Day of January, 2022

Drew Hirshfeld  
*Performing the Functions and Duties of the  
Under Secretary of Commerce for Intellectual Property and  
Director of the United States Patent and Trademark Office*